(12) United States Patent
Wang et al.

(10) Patent No.: US 12,338,299 B2
(45) Date of Patent: Jun. 24, 2025

(54) LONG-CHAIN BRANCHED PROPYLENE POLYMER COMPOSITION

(71) Applicant: BOREALIS AG, Vienna (AT)

(72) Inventors: Jingbo Wang, Linz (AT); Markus Gahleitner, Linz (AT); Klaus Bernreitner, Linz (AT); Katja Ellen Klimke, Linz (AT); Friedrich Berger, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/485,443

(22) Filed: Oct. 12, 2023

(65) Prior Publication Data

US 2024/0043584 A1 Feb. 8, 2024

Related U.S. Application Data

(62) Division of application No. 17/623,657, filed as application No. PCT/EP2020/067136 on Jun. 19, 2020, now Pat. No. 11,834,529.

(30) Foreign Application Priority Data

Jul. 4, 2019 (EP) .................................. 19184437

(51) Int. Cl.
*C08F 110/06* (2006.01)
*C08F 8/00* (2006.01)
*C08K 5/14* (2006.01)

(52) U.S. Cl.
CPC ........ *C08F 110/06* (2013.01); *C08F 2810/10* (2013.01)

(58) Field of Classification Search
CPC ...... C08F 110/06; C08F 2810/10; C08F 8/00; C08F 2500/12; C08K 5/14
See application file for complete search history.

(56) References Cited

U.S. PATENT DOCUMENTS

| | | | |
|---|---|---|---|
| 9,637,602 B2 | 5/2017 | Potter et al. |
| 9,670,293 B2 | 6/2017 | Reznichenko et al. |
| 9,670,347 B2 | 6/2017 | Tölsch et al. |
| 9,708,481 B2 | 7/2017 | Wang et al. |
| 9,745,431 B2 | 8/2017 | Potter et al. |
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,976,020 B2 | 5/2018 | Nummila-Pakarinen et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |
| 10,100,186 B2 | 10/2018 | Wang et al. |
| 10,227,427 B2 | 3/2019 | Reichelt et al. |
| 10,450,451 B2 | 10/2019 | Wang et al. |
| 10,519,259 B2 | 12/2019 | Resconi et al. |
| 10,870,718 B2 | 12/2020 | Denifl et al. |
| 11,292,900 B2 | 4/2022 | Gahleitner et al. |
| 11,299,617 B2 | 4/2022 | Prieto et al. |
| 11,390,732 B2 | 7/2022 | Van Houcke et al. |
| 11,492,478 B2 | 11/2022 | Kniesel et al. |
| 11,504,949 B2 | 11/2022 | Oderkerk et al. |
| 11,518,863 B2 | 12/2022 | Vijay |
| 11,530,321 B2 | 12/2022 | Kniesel et al. |
| 2010/0069580 A1* | 3/2010 | Standaert ................ C08F 10/06 526/64 |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |

(Continued)

FOREIGN PATENT DOCUMENTS

| | | |
|---|---|---|
| CN | 108 715 658 A | 10/2018 |
| EP | 0 887 379 A1 | 12/1998 |

(Continued)

OTHER PUBLICATIONS

Perkadox 24L Product Data Sheet. (Year: 2022).*
Borealis AG, "Daploy™ HMS Polypropylene for Foam Extrusion" (2010).
European Patent Office, Communication pursuant to Rule 114(2) EPC issued in European Patent Application No. 20733991.2 (Nov. 11, 2024).
Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.* 28: 1128-1134 (2007).

(Continued)

*Primary Examiner* — Catherine S Branch
(74) *Attorney, Agent, or Firm* — Leydig, Voit & Mayer, Ltd.

(57) ABSTRACT

Disclosed is a process for producing a propylene polymer composition, which includes (a) polymerizing propylene in the presence of a polymerization catalyst to produce a propylene polymer; (b) recovering the propylene polymer, wherein the recovered propylene polymer has a xylene cold solubles (XCS) fraction in an amount of less than 3.0 wt. % based on the total weight amount of the recovered propylene polymer; (c) extruding the propylene polymer in the presence of a peroxide for introducing long chain branching into the propylene polymer to form a propylene polymer composition; and (d) recovering the propylene polymer composition, wherein the recovered propylene polymer composition of step (d) has a lower melt flow rate MFR$_2$ (230°° C., 2.16 kg) compared to the recovered propylene polymer of step (b). Also disclosed is an article comprising said propylene polymer composition.

20 Claims, No Drawings

(56) References Cited

U.S. PATENT DOCUMENTS

| | | |
|---|---|---|
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313797 A1 | 11/2017 | Klimke et al. |
| 2017/0313867 A1 | 11/2017 | Lampela et al. |
| 2017/0320986 A1 | 11/2017 | Braun et al. |
| 2017/0321048 A1 | 11/2017 | Nummila-Pakarinen et al. |
| 2018/0016414 A1* | 1/2018 | Pehlert .......... C08G 83/005 |
| 2018/0079875 A1 | 3/2018 | Braun et al. |
| 2018/0194881 A1 | 7/2018 | Denifl et al. |
| 2018/0273740 A1 | 9/2018 | Braun et al. |
| 2020/0109260 A1 | 4/2020 | Pehlert et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0308385 A1 | 10/2020 | Gahleitner et al. |
| 2020/0347216 A1 | 11/2020 | Kniesel et al. |
| 2020/0392321 A1 | 12/2020 | Gahleitner et al. |
| 2021/0114352 A1 | 4/2021 | Oderkerk et al. |
| 2021/0171749 A1 | 6/2021 | Kumar et al. |
| 2021/0171750 A1 | 6/2021 | Gahleitner et al. |
| 2021/0214527 A1 | 7/2021 | Gahleitner et al. |
| 2021/0214533 A1 | 7/2021 | Kulshreshtha et al. |
| 2021/0238376 A1 | 8/2021 | Kahlen et al. |
| 2021/0253836 A1 | 8/2021 | Gahleitner et al. |
| 2021/0269560 A1 | 9/2021 | Krallis et al. |
| 2021/0324189 A1 | 10/2021 | Prieto et al. |
| 2021/0332227 A1 | 10/2021 | Wang et al. |
| 2021/0347971 A1 | 11/2021 | Wang et al. |
| 2022/0033631 A1 | 2/2022 | Gloger et al. |
| 2022/0135779 A1 | 5/2022 | Wang et al. |
| 2022/0204719 A1 | 6/2022 | Vijay |
| 2022/0227965 A1 | 7/2022 | Ruemer et al. |
| 2022/0251256 A1 | 8/2022 | Wang et al. |
| 2022/0289955 A1 | 9/2022 | Kahlen et al. |
| 2022/0306844 A1 | 9/2022 | Kahlen et al. |
| 2022/0315716 A1 | 10/2022 | Prieto et al. |
| 2022/0356330 A1 | 11/2022 | Kahlen et al. |
| 2023/0046086 A1 | 2/2023 | Al-Haj Ali et al. |
| 2023/0047329 A1 | 2/2023 | Al-Haj Ali |
| 2023/0212338 A1 | 7/2023 | Wang et al. |

FOREIGN PATENT DOCUMENTS

| | | |
|---|---|---|
| EP | 2 610 271 A1 | 7/2013 |
| EP | 2 610 272 A1 | 7/2013 |
| EP | 2 965 908 A1 | 1/2016 |
| EP | 3 018 153 A1 | 5/2016 |
| EP | 3 018 154 A1 | 5/2016 |
| JP | 2009-275123 A | 11/2009 |
| JP | 2011-507989 A | 3/2011 |
| JP | 2017-532415 A | 11/2017 |
| JP | 2017-532422 A | 11/2017 |
| JP | 2017-532425 A | 11/2017 |
| JP | 2018-503738 A | 2/2018 |
| JP | 2018-532843 A | 11/2018 |
| WO | WO 92/12182 A1 | 7/1992 |
| WO | WO 99/24478 A1 | 5/1999 |
| WO | WO 99/24479 A1 | 5/1999 |
| WO | WO 00/68315 A1 | 11/2000 |
| WO | WO 2004/000899 A1 | 12/2003 |
| WO | WO 2004/111095 A1 | 12/2004 |
| WO | WO 2009/077467 A1 | 6/2009 |
| WO | WO 2010/049370 A1 | 5/2010 |
| WO | WO 2012/007430 A1 | 1/2012 |
| WO | WO 2014/070384 A1 | 5/2014 |
| WO | WO 2016/071396 A1 | 5/2016 |
| WO | WO 2016/126429 A1 | 8/2016 |
| WO | WO 2016/126430 A1 | 8/2016 |
| WO | WO 2017/068106 A1 | 4/2017 |
| WO | WO 2021/001175 A1 | 1/2021 |

OTHER PUBLICATIONS

Busico et al., "Full Assignment of the $^{13}C$ NMR Spectra of Regioregular Polypropylenes: Methyl and Methylene Region," *Macromolecules* 30: 6251-6263 (1997).

Busico et al., "Microstructure of polypropylene," *Prog. Polym. Sci.* 26: 443-533 (2001).

Cheng, "$^{13}C$ NMR Analysis of Ethylene-Propylene Rubbers," *Macromolecules* 17: 1950-1955 (1984).

Resconi et al., "Selectivity in Propene Polymerization with Metallocene Catalysts," *Chem. Rev.* 100(4):1253-1345 (2000).

Wagner et al., "Rheotens-mastercurves and drawability of polymer melts," *Polymer Engineering and Science* 36(7): 925-935 (1996).

Wang et al., "Structural Analysis of Ethylene/Propylene Copolymers Synthesized with a Constrained Geometry Catalyst," *Macromolecules* 33: 1157-1162 (2000).

Zhou et al., "A new decoupling method for accurate quantification of polyethylene copolymer composition and triad sequence distribution with $^{13}C$ NMR," *J. Magnet. Reson.* 187: 225-233 (2007).

European Patent Office, Extended European Search Report in European Patent Application No. 19184437.2 (Jan. 27, 2020).

European Patent Office, International Search Report in International Application No. PCT/EP2020/067136 (Sep. 2, 2020).

European Patent Office, Written Opinion in International Application No. PCT/EP2020/067136 (Sep. 2, 2020).

International Bureau of WIPO, International Preliminary Report on Patentability in International Application No. PCT/EP2020/067136 (Dec. 28, 2021).

Japan Patent Office, Notice of Reasons for Rejection issued in Japanese Patent Application No. 2021-577875 (Jan. 10, 2023).

Borealis Ag "Daploy™ WB140HMS Polypropylene" Product Information, provided and sold by Suliao Zhijia (www.su-jiao.com), printed Apr. 1, 2024.

Chu et al., "Crystallization and Foaming Behavior of Polypropylene with a Crystal- Nucleating Agent," *Society of Plastic Engineers Annual Tech Conference, SPE ANTEC Orlando, Florida*, May 2015, pp. 2740-2742 (2015).

Japan Patent Office, Notice of Transmission of Duplicate of Written Opposition, Notice of Written Opposition to Patent (with exhibits) in Japanese Patent No. 7364703 (May 23, 2024).

U.S. Appl. No. 18/552,858, Jingbo Wang, filed Sep. 27, 2023.

* cited by examiner

LONG-CHAIN BRANCHED PROPYLENE POLYMER COMPOSITION

CROSS-REFERENCE TO RELATED APPLICATIONS

This patent application is a divisional of U.S. patent application Ser. No. 17/623,657, filed on Dec. 29, 2021, which is the U.S. national phase of International Application No. PCT/EP2020/067136, filed on Jun. 19, 2020, which claims the benefit of European Patent Application No. 19184437.2, filed Jul. 4, 2019.

BACKGROUND OF THE INVENTION

The present invention relates to a propylene polymer composition comprising a long chain branched propylene polymer, a process for preparing such a propylene polymer composition by means of post reactor modification of the propylene polymer, an article comprising such a propylene polymer composition, the use of such a propylene polymer composition for the production of an article and the use of such a process for preparing a propylene polymer composition comprising a long chain branched propylene polymer for increasing the melt strength of a propylene polymer composition.

Propylene homopolymers and copolymers are suitable for many applications such as packaging, textile, automotive, laboratory equipment and pipe. These polymers present a variety of properties such as for example high modulus, tensile strength, rigidity and heat resistance. These properties make polypropylenes very attractive materials in numerous applications such as for example films, foams, moulded articles or articles in automotive applications.

Light weight constructions are an everlasting topic in these applications, as solutions with higher stiffness are sought in order to reduce the usage of materials This is not only cost driven but also to reduce the consumption of raw materials and reduce the damage to the environment. The most relevant approach for reducing material density is foaming, for which, however, propylene polymers with linear chain structure are not well suited. Another important feature is thermal resistance. Many applications, especially in the moulding area, require higher thermal resistance in order to fill the article with hot food; therefore the heat distortion temperature (HDT) is crucial. Higher HDT is obviously beneficial especially for moulding application especially in the field of packaging.

This objective can be reached by subjecting the polypropylene to a post-reactor modification process such as for example a high melt strength (HMS) process. This process generates branching in the polypropylene material resulting in long-chain branched polypropylene. The long-chain branching is generally associated with improved melt-strength. These long-chain branched polypropylenes are therefore often used for making foams.

A challenge within the field of existing long-chain branched polypropylenes and their compositions is that their production generally leads to the formation of gels. Gel formation results in undesirable low melt strength in the polypropylene, limited poor mechanical performance and poor appearance of the articles based on it. Gel formation is reflected by the so-called xylene hot insoluble (XHU) fraction. Thus, there is a wish to improve polypropylene with high melt strength with respect to its gel content. By such an improvement, the articles obtained when using such a polypropylene will have improved and highly desirable properties such as improved stiffness, higher thermal resistance and superior appearance.

WO 2014/0016205 (in the name of BOREALIS AG) describes a high melt strength (HMS) post-reactor modification process wherein peroxide and butadiene are used to make long-chain branched polypropylene (b-PP) materials. The long-chain branched polypropylenes in WO 2014/0016205 are used to prepare foams with reduced gel content. For the preparation of the long-chain branched polypropylene in WO 2014/0016205 a specific polypropylene is used as base material.

EP 3 018 153 A1 and EP 3 018 154 A1 also describe a high melt strength (HMS) post-reactor modification process wherein peroxide and butadiene are used to make long-chain branched polypropylene (b-PP) materials for film and foam applications. The propylene polymer to be modified in said high melt strength (HMS) post-reactor modification process is polymerized in the presence of a catalyst system free of phthalates.

It is disclosed for these processes that for obtaining a long chain branched propylene polymer composition with a desired melt flow rate (MFR) range a base polypropylene material with a very low MFR has to be used for the preparation of the long-chain branched polypropylene, as the modification process described in these documents generally increases the MFR of the long chain branched propylene polymer composition compared to the base polypropylene material. Some of the disadvantages of this method are the necessary restriction to a certain MFR range of the base polypropylene and further the limitation to reach any desired MFR of the long-chain branched polypropylene composition. Therefore there still exists a need to improve the properties of the long-chain branched polypropylene material, more specifically its gel content and to improve the mechanical properties such as the stiffness and thermal resistance of the resultant long-chain branched polypropylene compositions.

It has surprisingly been found that by means of a modified high melt strength (HMS) post-reactor modification process a propylene polymer composition comprising a long-chain branched propylene polymer can be produced which show the desired improvement in heat resistance and mechanical properties. Preferably a carefully designed reactor made propylene polymer which is introduced to said modified process can contribute to obtaining a propylene polymer composition with said properties.

SUMMARY OF THE INVENTION

The present invention relates to a propylene polymer composition comprising a long chain branched propylene polymer, wherein said propylene polymer composition has
  a) a melt flow rate $MFR_2$ (230° C., 2.16 kg) of 0.8 to 6.0 g/10 min
  b) a xylene hot insolubles (XHU) fraction in an amount of not more than 0.80 wt %, based on the total weight amount of the propylene polymer composition,
  c) a melting temperature Tm of at least 160.0° C.,
  d) a F30 melt strength of from 5.0 to less than 30.0 cN, and
  e) a heat distortion temperature (HDT) of at least 108° C.

The present invention further relates to a process for producing a propylene polymer composition comprising the following steps:
  a) Polymerizing propylene in the presence of a polymerization catalyst to produce a propylene polymer;

b) Recovering the propylene polymer;

c) Extruding the propylene polymer in the presence of a peroxide for introducing long chain branching into the propylene polymer; and d) Recovering the propylene polymer composition.

Still further, the present invention relates to an article comprising the propylene polymer composition as defined above or below.

Additionally, the present invention relates to the use of the propylene polymer composition as defined above or below for the production of an article.

Finally, the present invention relates to the use of the process as defined above or below for increasing the melt strength of a propylene polymer composition.

DEFINITIONS

According to the present invention the expression "propylene homopolymer" relates to a polypropylene that consists substantially, i.e. of at least 99.0 wt %, more preferably of at least 99.5 wt %, still more preferably of at least 99.8 wt %, like at least 99.9 wt % of propylene units. In another embodiment only propylene units are detectable, i.e. only propylene has been polymerized.

According to the present invention the terms "phthalate" or "phthalic compound" refer to phthalic acid (CAS No. 88-99-3), its mono- and diesters with aliphatic, alicyclic and aromatic alcohols as well as phthalic anhydride.

Percentages are usually given herein as weight-% (wt %) if not stated otherwise.

DETAILED DESCRIPTION OF THE INVENTION

Propylene Polymer Composition

The present invention relates to a propylene polymer composition comprising a long chain branched propylene polymer, wherein said propylene polymer composition has a) a melt flow rate $MFR_2$ (230° C., 2.16 kg) of 0.8 to 6.0 g/10 min b) a xylene hot insolubles (XHU) fraction in an amount of not more than 0.80 wt %, based on the total weight amount of the propylene polymer composition, c) a melting temperature Tm of at least 160.0° C., d) a F30 melt strength of from 5.0 to less than 30.0 cN, and e) a heat distortion temperature (HDT) of at least 108° C.

The propylene polymer composition can comprise the long chain branched propylene polymer together with other compounds selected from additives and or polymers.

The propylene polymer composition preferably comprises, more preferably consists of the long chain branched propylene polymer as only polymeric component and optional additives.

Illustrative additives to be used in the propylene polymer composition of the present invention include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer-Tropsch waxes, montan-based waxes, fluoro-based compounds, or paraffin waxes), nucleating agents (for example talc, benzoates, phosphorous-based compounds, sorbitoles, nonitol-based compounds or amide-based compounds), as well as slip and antiblocking agents (for example erucamide, oleamide, talc, natural silica and synthetic silica or zeolites) and mixtures thereof.

Generally the total amount of additives in the propylene polymer composition is not more than 5.0 wt %, preferably not more than 1.0 wt %, like in the range of 0.005 to 0.995 wt %, more preferably not more than 0.8 wt %, based on the total weight of the propylene polymer composition.

Polymers to be used in the propylene polymer composition of the present invention preferably include thermoplastic polymers.

Preferably the total amount of additives, polymers and/or combinations thereof in the propylene polymer composition according to the invention is not more than 5.0 wt %, more preferably not more than 0.995 wt %, like in the range of 0.005 to 1.0 wt %, based on the total weight of the propylene polymer composition according to the invention.

The propylene polymer composition preferably does not contain fillers and/or reinforcement agents in an amount exceeding 5.0 wt.-%. In one embodiment the propylene polymer composition does not contain fillers and/or reinforcement agents.

Although not preferred the propylene polymer composition according to the invention can further comprise fillers and/or reinforcement agents. Fillers to be used in the long-chain branched polypropylene composition (b-PP-C) according to the invention include, but are not limited to talc, calcium carbonate, calcium sulphate, clay, kaolin, silica, glass, fumed silica, mica, wollastonite, feldspar, aluminium silicate, calcium silicate, alumina, hydrated alumina such as alumina trihydrate, glass microsphere, ceramic microsphere, wood flour, marble dust, magnesium oxide, magnesium hydroxide, antimony oxide, zinc oxide, barium sulphate and/or titanium dioxide. Reinforcement agents to be used in the propylene polymer composition according to the invention include, but are not limited to mineral fibers, glass fibers, carbon fibers, organic fibers and/or polymer fibers.

Preferably the total amount of additives, polymers, fillers, reinforcement agents and/or combinations thereof in the propylene polymer composition according to the invention is not more than 5.0 wt %, more preferably not more than 1.0 wt %, like in the range of 0.005 to 0.995 wt %, based on the total weight of the propylene polymer composition according to the invention.

The propylene polymer composition has a melt flow rate $MFR_2$ (230° C., 2.16 kg) of 0.8 to 6.0 g/10 min, preferably of 0.9 to 5.5 g/10 min, more preferably 1.0 to 5.0 g/10 min and most preferably 1.1 to 2.0 g/10 min.

Further, the propylene polymer composition has a xylene hot insolubles (XHU) fraction in an amount of not more than 0.80 wt %, preferably of not more than 0.65 wt %, more preferably not more than 0.50 wt % and most preferably not more than 0.30 wt %, based on the total weight amount of the propylene polymer composition. As a lower limit, in some embodiments no xylene hot insolubles (XHU) fraction is detectable in the propylene polymer composition.

Still further, the propylene polymer composition has a melting temperature Tm as determined by differential scanning calorimetry (DSC) of at least 160.0° C., preferably of 161.0 to 175.0° C., more preferably 162.0 to 172.0° C., and most preferably 164.0 to 170.0° C.

Additionally, the propylene polymer composition has a F30 melt strength as determined by the Rheotens method of from 5.0 to less than 30.0 cN, preferably of from 6.0 to 28.0 cN, more preferably of from 7.0 to 26.0 cN and most preferably of from 10.0 to 21.0 cN.

Further, the propylene polymer composition has a heat distortion temperature (HDT) as determined in accordance with ISO 75 B of at least 108° C., preferably of 109 to 130° C., more preferably 110 to 128° C. and most preferably 112 to 125° C.

It is further preferred that the propylene polymer composition has a crystallization temperature Tc as determined by DSC of more than 120.0° C., more preferably 122.0 to 145.0° C., still more preferably 126.0 to 140.0° C. and most preferably 129.0 to 138.0° C.

Additionally the propylene polymer composition preferably has a melting enthalpy Hm as determined by DSC of more than 106 J/g, more preferably 108 to 125 J/g, still more preferably 109 to 123 J/g and most preferably 110 to 120 J/g.

Further, the propylene polymer composition preferably has a V30 melting extensibility as determined by the Rheotens method of at least 190 mm/s, more preferably 200 to 500 mm/s, still more preferably 210 to 400 mm/s and most preferably 210 to 300 mm/s.

Still further, the propylene polymer composition preferably has a xylene cold solubles (XCS) fraction in an amount of less than 3.0 wt %, preferably of from 0.5 to 2.8 wt %, more preferably of from 0.8 to 2.6 wt % and most preferably of from 1.0 to 2.4 wt %, based on the total weight amount of the propylene polymer composition.

Additionally, the propylene polymer composition preferably has a flexural modulus as determined in accordance with ISO 178 of more than 1900 MPa, more preferably at least 1925 MPa, still more preferably at least 1950 MPa and most preferably from 1975 MPa to up to 2500 MPa.

The propylene polymer composition according to the present invention surprisingly combines an improved balance of properties of good melt strength as can been seen in its F30 melt strength and V30 melting extensibility, a high crystallinity as can be seen in its melting temperature, melting enthalpy and crystallization temperature and low amount of XCS fraction, low gel content illustrated by the low amount of XHU fraction, high stiffness as can be seen by the flexural modulus and improved heat resistance illustrated by the heat distortion temperature (HDT). The propylene polymer composition according to the present invention is therefore especially applicable for films, foams and moulded articles especially in light weight applications, automotive applications and packaging applications, such as food packaging applications.

The propylene polymer composition according to the invention as defined above or below is prepared a modified high melt strength (HMS) post-reactor modification process in which long chain branching is introduced into a propylene polymer.

Process

The present invention further relates to a process for producing a propylene polymer composition comprising the following steps:
a) Polymerizing propylene in the presence of a polymerization catalyst to produce a propylene polymer;
b) Recovering the propylene polymer;
c) Extruding the propylene polymer in the presence of a peroxide for introducing long chain branching into the propylene polymer; and
d) Recovering the propylene polymer composition.

Thereby, the propylene polymer composition resulting from said process is preferably defined as the propylene polymer composition according to the invention as defined above or below.

Polymerization of the Propylene Polymer

The propylene polymer polymerized in process step a) can be a propylene homopolymer or a copolymer of propylene. It is especially preferred that the propylene polymer is a propylene homopolymer.

The propylene polymer can be produced in a sequential step process, using reactors in serial configuration and operating at different reaction conditions. As a consequence, each fraction prepared in a specific reactor can have its own molecular weight distribution and/or comonomer content distribution depending on the type of propylene polymer produced (propylene homopolymer or copolymer). When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps. Accordingly the propylene homopolymer or copolymer may be multimodal, like bimodal, in view of the molecular weight and/or comonomer content depending on the type of propylene polymer produced (propylene homopolymer or copolymer).

In case the propylene copolymer is of multimodal, like bimodal, character, in view of the comonomer content, it is appreciated that the individual fractions are present in amounts influencing the properties of the material. Accordingly it is appreciated that each of these fractions is present in an amount of at least 10 wt % based on the propylene copolymer. Accordingly in case of a bimodal system, in particular in view of the comonomer content, the split of the two fractions is preferably 40:60 to 60:40, like roughly 50:50.

Polymerization processes which are suitable for producing the propylene polymer are known in the state of the art and comprise at least one polymerization stage, where polymerization is typically carried out in solution, slurry, bulk or gas phase. Typically the polymerization process comprises additional polymerization stages or reactors. In one particular embodiment the process contains at least one bulk reactor zone and at least one gas phase reactor zone, each zone comprising at least one reactor and all reactors being arranged in cascade. In one particularly preferred embodiment the polymerization process comprises at least one bulk reactor and at least one gas phase reactor arranged in that order. In some preferred processes the process comprises one bulk reactor and at least two, e.g. two or three gas phase reactors. The process may further comprise pre- and post-reactors. Pre-reactors comprise typically pre-polymerization reactors. In this kind of processes the use of higher polymerization temperatures is preferred in order to achieve specific properties of the polymer. Typical temperatures in these processes are 70° C. or higher, preferably 80° C. or higher, even 85° C. or higher. The higher polymerization temperatures as mentioned above can be applied in some or all reactors of the reactor cascade.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315. A further suitable slurry-gas phase process is the Spheripol® process of Basell.

Suitably a specific type of Ziegler-Natta catalyst is used for polymerizing the propylene polymer. It is especially preferred that the internal donor of the Ziegler-Natta catalyst is a non-phthalic compound. Preferably through the whole catalyst preparation no phthalate compounds are used thus the final catalyst does not contain any phthalic compound. Therefore the propylene polymer polymerized in process step a) is free of phthalic compounds.

The catalyst used in the present invention belongs to the group of Ziegler-Natta catalysts. Generally these catalysts comprise one or more compounds of a transition metal of Group 4 to 6 as defined in IUPAC version 2013, like titanium, further a Group 2 metal compound, like a magnesium compound and an internal donor (ID). In the present invention the internal donor (ID) is chosen to be a non-phthalic compound, in this way the catalyst is fully free of undesired phthalic compounds. Further the solid catalyst is preferable free of any external support material, like silica or $MgCl_2$, and thus the catalyst is self-supported.

The solid catalyst is obtainable by the following general procedure:
  a) providing a solution of
    a1) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or
    a2) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
    a3) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
    a4) Group 2 metal alkoxy compound of formula $M(OR_1)_n(OR_2)_m X_{2-n-m}$ or mixture of Group 2 alkoxides $M(OR_1)_n X_{2-n}$ and $M(OR_2)_m X_{2-m}$, where M is a Group 2 metal, X is halogen, $R_1$ and $R_2$ are different alkyl groups of 2 to 16 carbon atoms, and $0 \leq n < 2$, $0 \leq m < 2$ and $n+m+(2-n-m)=2$, provided that n and m are not 0 simultaneously, $0 < n' \leq 2$ and $0 < m' \leq 2$; and
  b) adding said solution from step a) to at least one compound of a transition metal of Group 4 to 6 and
  c) obtaining the solid catalyst component particles, and adding a non-phthalic internal electron donor (ID) at least in one step prior to step c).

The internal donor (ID) or precursor thereof is added preferably to the solution of step a) or to the transition metal compound before adding the solution of step a).

According to the procedure above the solid catalyst can be obtained via a precipitation method or via an emulsion-solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of $a_2$) or $a_3$) is used, i.e. a solution of (Ax') or a solution of a mixture of (Ax) and (Bx).

Preferably the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched $C_2$-$C_{16}$ alkyl residue, preferably a $C_4$ to $C_{10}$ alkyl residue, more preferably a $C_6$ to $C_8$ alkyl residue. The most preferred monohydric alcohol is 2-ethyl-1-hexanol or octanol.

Preferably a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different $C_1$-$C_{20}$ alkyl groups, preferably $C_2$-$C_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that the magnesium compound reacts in addition to the alcohol (A) and alcohol (B) with a polyhydric alcohol (C) of formula $R''(OH)_m$ to obtain said magnesium alkoxide compound. Preferred polyhydric alcohols, if used, are alcohols, wherein R" is a straight-chain, cyclic or branched $C_2$ to $C_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal compound of Group 4 to 6 as defined in IUPAC version 2013 is preferably a titanium compound, most preferably a titanium halide, like $TiCl_4$.

The non-phthalic internal donor (ID) used in the preparation of the catalyst used in the present invention is preferably selected from (di)esters of non-phthalic carboxylic (di)acids, 1,3-diethers, derivatives and mixtures thereof An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives of any of them and/or mixtures of any of them. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion-solidification method may be washed at least once, preferably at least twice, most preferably at least three times. The washing can take place with an aromatic and/or aliphatic hydrocarbon, preferably with toluene, heptane or pentane. Washing is also possible with $TiCl_4$ optionally combined with the aromatic and/or aliphatic hydrocarbon. Washing liquids can also contain donors and/or compounds of Group 13, like trialkyl aluminium, halogenated alky aluminium compounds or alkoxy aluminium compounds.

Aluminium compounds can also be added during the catalyst synthesis. The catalyst can further be dried, for example by evaporation or flushing with nitrogen or it can be slurried to an oily liquid without any drying step.

The finally obtained Ziegler-Natta catalyst is desirably obtained in the form of particles having generally an average particle size range of 5 to 200 μm, preferably 10 to 100 μm. The particles generally are compact with low porosity and generally have a surface area below 20 $g/m^2$, more preferably below 10 $g/m^2$. Typically the amount of Ti present in the catalyst is in the range of 1 to 6 wt %, the amount of Mg is in the range of 10 to 20 wt % and the amount of internal donor present in the catalyst is in the range of 10 to 40 wt % of the catalyst composition. A detailed description of the preparation of the catalysts used in the present invention is disclosed in WO 2012/007430, EP2610271 and EP2610272 which are incorporated here by reference.

Especially suitable for the present invention is a Ziegler-Natta catalyst, which has a low particle size range. Preferred particle sizes are a median $d_{50}$ particle size in the range of 5.0 to 50.0 μm, more preferred of 7.5 to 40 μm and most preferred of 10.0 to 30.0 μm. Additionally, the Ziegler-Natta catalyst preferably has a top cut $d_{90}$ particle size in the range of 15.0 μm to 70.0 μm, more preferably of 20.0 μm to 60.0 μm and most preferably of 30 μm to 50.0 μm.

These low particle size range can either be obtained from the preparation method, preferably the preparation method as described above, or, in the case that higher particle size ranges are obtained after preparation, by methods for separating particles with smaller particle size ranges known in the art, such as e.g. sieving.

An external donor (ED) is preferably present as a further component in the polymerization process. Suitable external donors (ED) include certain silanes, ethers, esters, amines, ketones, heterocyclic compounds and blends of these. It is especially preferred to use a silane. It is most preferred to use silanes of the general formula (III)

$$R^a_p R^b_q Si(OR^c)_{(4-p-q)} \qquad (III)$$

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (III) are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Another most preferred silane is according to the general formula (IV)

$$Si(OCH_2CH_3)_3(NR^3R^4) \qquad (IV)$$

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

In addition to the Ziegler-Natta catalyst and the optional external donor (ED) a co-catalyst can be used. The co-catalyst is preferably a compound of group 13 of the periodic table (IUPAC, version 2013), such as for example an aluminum compound e.g. an organo aluminum or aluminum halide compound. An example of a suitable organo aluminium compound is an aluminum alkyl or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally the ratio between the co-catalyst (Co) and the external donor (ED) [Co/ED] and/or the ratio between the co-catalyst (Co) and the transition metal (TM) [Co/TM] is carefully chosen for each process. The ratio between the co-catalyst (Co) and the external donor (ED), [Co/ED] can suitably be in the range of 3.0 to 45.0 mol/mol, preferably in the range of 4.0 to 35.0 mol/mol, more preferably in the range of 5.0 to 30.0 mol/mol. A suitable lower limit can be 3.0 mol/mol, preferably 4.0 mol/mol, more preferably 5.0 mol/mol. A suitable upper limit can be 45.0 mol/mol, preferably 35.0 mol/mol, more preferably 30.0 mol/mol. The lower and upper indicated values of the ranges are included.

The ratio between the co-catalyst (Co) and the transition metal (TM), [Co/TM] can suitably be in the range of 40.0 to 500 mol/mol, preferably in the range of 50.0 to 400 mol/mol, more preferably in the range of 60.0 to 350 mol/mol. A suitable lower limit can be 40.0 mol/mol, preferably 50.0 mol/mol, more preferably 60.0 mol/mol. A suitable upper limit can be 500 mol/mol, preferably 400 mol/mol, more preferably 350 mol/mol. The lower and upper indicated values of the ranges are included.

Recovered Propylene Polymer

The propylene polymer which is recovered from the polymerization step in step b) of the process of the invention is herein denoted "recovered propylene polymer" or simply "propylene polymer".

The propylene polymer is preferably free of phthalic compound.

The propylene polymer is preferably a propylene homopolymer.

It is further preferred that the propylene polymer has a pentad isotacticity of more than 94%, more preferably in the range of 95 to 99%.

The propylene homopolymer will further preferably have a content of 2,1 regio-defects of less than 0.2 mol %.

Preferably the propylene polymer has a xylene cold soluble (XCS) fraction measured according to ISO 16152 (25° C.) an amount of less than 3.0 wt %, more preferably from 0.5 to 2.8 wt %, still more preferably from 0.8 to 2.6 wt % and mot preferably from 1.0 to 2.4 wt %, based on the total weight amount of the propylene polymer.

Further, the propylene polymer preferably has a melt flow rate $MFR_2$ (230° C., 2.16 kg) of from 1.0 to 10.0 g/10 min, more preferably 2.0 to 8.0 g/10 min, still more preferably 2.5 to 6.0 g/10 min and most preferably 3.0 to 5.0 g/10 min.

The porosity and the specific pore volume of the inventive propylene homopolymer or copolymer are measured by mercury porosimetry according to DIN 66133 in combination with helium density measurement according to DIN 66137-2. The porosity is calculated by equation (II) as follows:

$$\text{Porosity [\%]} = \left[\text{specific pore volume} \bigg/ \left(\text{specific pore volume} + \frac{1}{\text{density}}\right)\right] * 100 \quad (II)$$

The porosity of the inventive propylene homopolymer or copolymer is preferably higher than 8.0%, more preferably in the range of 8.5 to 20.0%, still more preferably in the range of 9.0 to 15.0%. The specific pore volume of the inventive propylene homopolymer or copolymer is generally higher than 0.10 $cm^3/g$, preferably in the range of 0.11 to 0.22 $cm^3/g$, more preferably in the range of 0.12 to 0.20 $cm^3/g$.

According to the invention, the median particle size d50 and the top-cut particle size d95 of the propylene homopolymer or copolymer are measured by sieve analysis according to ISO 3310 and evaluated according to ISO 9276-2. The median particle size d50 is in the range of from 100 to 1200 µm, preferably 150 to 1000 µm, still more preferably 200 to 800 µm and most preferably 250 to 500 µm. The top-cut particle size d95 is in the range of from 300 to 2500 µm, preferably 350 to 2200 µm, still more preferably 400 to 2000 µm and most preferably 450 to 1000 µm.

The propylene polymer can be unimodal or multimodal, in view of the molecular weight distribution and/or in view of the comonomer content distribution (the latter only in the case of the propylene copolymer).

When the propylene polymer is unimodal with respect to the molecular weight distribution and/or comonomer content, it may be prepared in a single stage process e.g. as slurry or gas phase process in respectively a slurry or gas phase reactor.

Preferably, the unimodal propylene polymer is prepared in a slurry reactor. Alternatively, the unimodal propylene polymer may be produced in a multistage process using at each stage, process conditions which result in similar polymer properties.

The expression "multimodal" or "bimodal" used herein refers to the modality of the polymer, i.e.

the form of the polymer's molecular weight distribution curve, which is the graphical representation of the molecular weight fraction as a function of its molecular weight or the form of the copolymer's comonomer content distribution curve, which is the graphical representation of the comonomer content as a function of the molecular weight of the polymer fractions.

As will be explained above, the polymer fractions of the propylene polymer can be produced in a sequential step process, using reactors in serial configuration and operating at different reaction conditions. As a consequence, each fraction prepared in a specific reactor can have its own molecular weight distribution and/or comonomer content distribution depending on the type of propylene polymer produced (propylene homopolymer or copolymer). When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps. Accordingly the propylene polymer may be multimodal, like bimodal, in view of the molecular weight and/or comonomer content depending on the type of propylene polymer produced (propylene homopolymer or copolymer).

In case the propylene copolymer is of multimodal, like bimodal, character, in view of the comonomer content, it is appreciated that the individual fractions are present in amounts influencing the properties of the material. Accordingly it is appreciated that each of these fractions is present in an amount of at least 10 wt % based on the propylene copolymer. Accordingly in case of a bimodal system, in particular in view of the comonomer content, the split of the two fractions is preferably 40:60 to 60:40, like roughly 50:50.

The propylene polymer is modified during an extrusion step in the presence of a peroxide in order to introduce long chain branching into the propylene polymer in process step c) of the process of the invention.

Introduction of Long Chain Branching During Extrusion Step

The long-chain branching is introduced into the propylene by a reactive modification of the propylene polymer. This reactive modification process is also part of the present invention. The reactive modification for producing the long-chain branched propylene polymer is preferably performed by a reaction of the propylene polymer with a thermally decomposing free radical-forming agent.

It is especially preferred that for the reactive modification no functionally unsaturated compound chosen from:
 a) at least one bifunctionally unsaturated monomer and/or polymer or
 b) at least one multifunctionally unsaturated monomer and/or polymer or
 c) a mixture of (a) and (b)

is present. "Bifunctionally unsaturated or multifunctionally unsaturated" as used above means the presence of respectively two or more non-aromatic double bonds. Examples are e.g. divinylbenzene, cyclopentadiene or polybutadiene.

The reactive modification step for producing a long-chain branched propylene polymer preferably comprises the steps of: introducing the propylene polymer recovered in process step b) of the process of the invention into a melt mixing device, further introducing a thermally decomposing free radical-forming agent such as a peroxide into said melt mixing device and melt mixing the propylene polymer and the thermally decomposing free radical-forming agent in said melt mixing device at a barrel temperature in the range of 160 to 280° C., more preferably 170 to 270° C. and most preferably 180 to 235° C.

Suitably said melt mixing device is a continuous melt mixing device like for example a single screw extruder, a co-rotating twin screw extruder or a co-rotating kneader. Preferably, the melt mixing device includes a feed zone, a kneading zone and a die zone. More preferably, a specific temperature profile is maintained along the screw of the melt-mixing device, having an initial temperature T1 in the feed zone, a mid temperature T2 in the kneading zone and a final temperature T3 in the die zone, all temperatures being defined as barrel temperatures. Barrel temperature T1 (in the feed zone) is preferably in the range of 160 to 220° C. Barrel temperature T2 (in the kneading zone) is preferably in the range of 180 to 260° C. Barrel temperature T3 (in the die zone) is preferably in the range of 210 to 270° C. The screw speed of the melt mixing device can be adjusted depending on the material characteristics. The man skilled in the art is well familiar with this and can easily determine the appropriate screw speed. Generally the screw speed can be adjusted to a range from 100 to 750 rotations per minute (rpm), preferably to a range from 150 to 650 rotations per minute (rpm). Following the melt-mixing step, the resulting long-chain branched propylene homopolymer or copolymer melt can be pelletized, for example in an underwater pelletizer or after solidification of one or more strands in a water bath, in a strand pelletizer.

It is especially preferred that the propylene polymer and the thermally decomposing free radical-forming agent are not premixed at a lower temperature in a premixing step before being introduced into the melt mixing device. It is further especially preferred that no functionally unsaturated compound as described above is added to the melt mixing device.

In the reactive modification for producing a long-chain branched propylene polymer, the propylene polymer is suitably mixed with 0.10 wt % to 5.00 wt % parts per weight (ppw) of peroxide per 100 parts per weight of propylene polymer, preferably mixed with 0.30 to 3.50 parts per weight (ppw) of peroxide per 100 parts per weight of propylene polymer, more preferably in the presence of 0.50 to 3.00 parts per weight (ppw) of peroxide per 100 parts per weight of propylene polymer and most preferably in the presence of 0.70 to 2.00 parts per weight (ppw) of peroxide per 100 parts per weight of propylene polymer.

The thermally decomposing free radical-forming agent usually is a peroxide.

For the present process, the peroxide is preferably chosen as to have a half-time ($t_{1/2}$) of not more than 6 min at said above defined barrel temperature of 160 to 280° C. Thereby, the half-time is the time required to reduce the original peroxide content of a composition by 50%, at a given temperature and indicates the reactivity of said peroxide.

Preferred peroxides are selected from the group of dialkyl peroxides, such as dialkyl peroxydicarbonates. Suitable examples for dialkyl peroxydicarbonates are di-($C_{2-20}$)-alkyl peroxydicarbonates, preferably di-($C_{4-16}$)-alkyl peroxydicarbonates, more preferably di-($C_{8-14}$)-alkyl peroxydicarbonates. Especially preferred are di-(2-ethylhexyl) peroxydicarbonate, di-(4-tert-butylcyclohexyl) peroxycarbonate, dicetyl peroxydicarbonate, and dimyristyl peroxycarbonate. Especially preferred is dicetyl peroxydicarbonate.

During the extrusion and modification step c) also other components can be added to the melt mixing device such as the additives and/or polymeric compounds as described above. These optional components can be introduced into the melt mixing device via a side feeder for example.

From said extrusion and modification step c) as described above or below the propylene polymer composition is recovered.

Recovered Propylene Polymer Composition

The recovered propylene polymer composition of process step d) of the process according to the invention preferably has a lower melt flow rate $MFR_2$ (230° C., 2.16 kg) compared to the recovered propylene polymer of process step b).

This is insofar surprising as in the high melt strength (HMS) post-reactor modification processes described in EP 3 018 153 A1 and EP 3 018 154 A1 an increase of the melt flow rate $MFR_2$ (230° C., 2.16 kg) of the resulting propylene polymer composition compared to the reactor based propylene polymer has been observed. This surprising finding allows a broader spectrum of MFR ranges of the recovered propylene polymer of process step b) and as a consequence milder melt mixing conditions due to the possibility of using propylene polymers with a higher MFR.

It is preferred that the recovered propylene polymer composition comprises at least 95.0 wt %, more preferably at least 99.0 wt %, most preferably at least 99.005 wt %, of the propylene polymer which has been long chain branched in process step c).

Preferably, the recovered propylene polymer composition of process step d) of the process according to the invention refers to the propylene polymer compositions according to the present invention with all the properties as described above or below.

Article

The present invention further relates to an article comprising the propylene polymer composition as defined above or below.

The article is preferably selected from films, foams and moulded articles especially in light weight applications, automotive applications and packaging applications, such as food packaging applications.

Preferably, the article of the invention comprises at least 70.0 wt %, more preferably at least 80.0 wt %, most preferably at least 90.0 wt %, still most preferably at least 95.0 wt %, of the propylene polymer composition according to the invention. The above given weight percent (wt %) is calculated based on the total of thermoplastic material comprised in the article. In a preferred embodiment the article consists of the propylene polymer composition according to the invention.

The processes for preparing the films, foams and moulded articles comprising the propylene polymer composition according to the present invention are generally known in the art.

Use

The present invention further relates to the use of the propylene polymer composition as defined above or below for the production of an article.

Said article is preferably selected from films, foams and moulded articles especially in light weight applications, automotive applications and packaging applications, such as food packaging applications as described above or below.

Finally, the present invention relates to the use of the process as defined above or below for increasing the melt strength of a propylene polymer composition.

Preferably, said propylene polymer composition refers to the propylene polymer composition according to the present invention with all the properties as described above or below.

EXAMPLES

Determination Methods
a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

b) Particle Size/Particle Size Distribution

A sieve analysis according to ISO 3310 was performed on the polymer samples. The sieve analysis involved a nested column of sieves with wire mesh screen with the following sizes: >20 µm, >32 µm, >63 µm, >100 µm, >125 µm, >160 µm, >200 µm, >250 µm, >315 µm, >400 µm, >500 µm, >710 µm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve. The particle size distribution and the characteristic median particle size d50 as well as the top-cut particle size d95 were determined from the results of the sieve analysis according to ISO 9276-2.

c) XHU Fraction. Gel Content

The xylene hot insoluble (XHU) fraction is determined according to EN 579. About 2.0 g of the polymer ($m_p$) are weighted and put in a mesh of metal which is weighted, the total weight being represented by ($m_{p+m}$). The polymer in the mesh is extracted in a soxhlet apparatus with boiling xylene for 5 hours. The eluent is then replaced by fresh xylene and boiling is continued for another hour. Subsequently, the mesh is dried and weighted again ($m_{XHU+m}$). The mass of the xylene hot insoluble ($m_{XHU}$) obtained by the formula $m_{XHU+m} - m_m = m_{XHU}$ is put in relation to the weight of the polymer ($m_p$) to obtain the fraction of xylene insolubles $m_{XHU}/m_p$.

d) $F_{30}$ Melt Strength and $v_{30}$ Melt Extensibility

The test described herein follows ISO 16790:2005. The strain hardening behaviour is determined by the method as described in the article "Rheotens-Mastercurves and Drawability of Polymer Melts", M. H. Wagner, Polymer Engineering and Sience, Vol. 36, pages 925 to 935. The strain hardening behaviour of polymers is analysed with a Rheotens apparatus (product of Göttfert, Siemensstr.2, 74711 Buchen, Germany) in which a melt strand is elongated by drawing down with a defined acceleration. The Rheotens experiment simulates industrial spinning and extrusion processes. In principle a melt is pressed or extruded through a round die and the resulting strand is hauled off. The stress on the extrudate is recorded as a function of melt properties and measuring parameters (especially the ratio between output and haul-off speed, practically a measure for the extension rate).

For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero). Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec². The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

e) Xylene Cold Soluble Fraction (XCS, wt %)

The amount of the polymer soluble in xylene is determined at 25.0° C. according to ISO 16152; 5$^{th}$ edition; 2005-07-01.

f) Melting Temperature

The melting temperature, $T_m$, is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The crystallization temperature ($T_c$) is determined from the cooling step while melting temperature ($T_m$) and melting enthalpy ($H_m$) are being determined in the second heating step.

g) Porosity and Specific Pore Volume

The porosity and the specific pore volume of the polymer are measured by mercury porosimetry according to DIN 66133 in combination with helium density measurement according to DIN 66137-2. The samples were first dried for 3 hours at 70° C. in a heating cabinet then stored in an exsiccator until the measurement. The pure density of the samples was determined on milled powder using helium at 25° C. in a Quantachrome Ultrapyknometer 1000-T (DIN 66137-2). Mercury porosimetry was performed on non-milled powder in a Quantachrome Poremaster 60-GT in line with DIN 66133.

The porosity is calculated by equation (II) like:

$$\text{Porosity } [\%] = \left[\text{specific pore volume} \Big/ \left(\text{specific pore volume} + \frac{1}{\text{density}}\right)\right] * 100 \quad (II)$$

h) Flexural Modulus

The flexural modulus was determined in 3-point-bending at 23° C. according to ISO 178 on 80×10×4 mm³ test bars injection moulded in line with EN ISO 1873-2.

i) Quantification of Microstructure by NMR Spectroscopy

Quantitative nuclear-magnetic resonance (NMR) spectroscopy was used to quantify the isotacticity and regio-regularity of the propylene homopolymers. Quantitative $^{13}$C{$^{1}$H} NMR spectra were recorded in the solution-state using a Bruker Advance III 400 NMR spectrometer operating at 400.15 and 100.62 MHz for $^{1}$H and $^{13}$C respectively. All spectra were recorded using a $^{13}$C optimised 10 mm extended temperature probehead at 125° C. using nitrogen gas for all pneumatics.

For propylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}$C{$^{1}$H} NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e]mol.-%=100*($P_{21e}/P_{total}$)

j) Heat Distortion Temperature (HDT)

The HDT was determined on injection molded test specimens of 80×10×4 mm³ prepared according to ISO 1873-2 and stored at +23° C. for at least 96 hours prior to measurement. The test was performed on flatwise supported specimens according to ISO 75, condition A, with a nominal surface stress of 1.80 MPa.

2. Preparation of the Propylene Polymer a) Catalyst Preparation 3.4 litre of 2-ethylhexanol and 810 ml of propylene glycol butyl monoether (in a molar ratio 4/1) were added to a 20.0 l reactor. Then 7.8 litre of a 20.0% solution in toluene of BEM (butyl ethyl magnesium) provided by Crompton GmbH, were slowly added to the well stirred alcohol mixture. During the addition the temperature was kept at 10.0° C. After addition the temperature of the reaction mixture was raised to 60.0° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder.

The specific low particle size range required for the present invention was achieved by screening with 50 μm mesh size after the last heptane washing step. This resulted in a median $d_{50}$ particle size of 21 μm and a $d_{90}$ particle size of 40 μm. The catalyst was further characterized by a Ti content of 2.0 wt.-% and content of bis(2-ethylhexyl)citraconate as internal donor of 17.0 wt.-%.

b) Polymerization of PP-1 and PP-2

The propylene polymers used for inventive and comparative examples were produced in a pilot plant with a prepolymerization reactor, one slurry loop reactor and one gas phase reactor. The solid catalyst component described above was used for the propylene polymer PP-1 used for producing the propylene polymer composition of inventive examples IE1 and 1E2 and comparative example CE1 along with triethyl-aluminium (TEAL) as co-catalyst and dicyclo pentyl dimethoxy silane (D-donor) as external donor.

The propylene polymer PP-2 used for producing the propylene polymer composition of comparative example CE2 and CE3 is a polypropylene homopolymer from a hydrocarbon slurry process, based on a $3^{rd}$ generation Ziegler-Natta catalyst without internal donor and using methyl methacrylate as external donor.

The co-catalyst to donor ratio, the co-catalyst to titanium ratio and the polymerization conditions are indicated in Table 1.

TABLE 1

| Polymerization and polymer properties | | | |
|---|---|---|---|
| | | PP-1 | PP-2 |
| Polymerization | | | |
| Co/ED ratio | mol/mol | 20 | |
| Co/Ti ratio | mol/mol | 68.2 | |
| Loop (Reactor 1) | | | |
| Time | h | 0.5 | |
| Temperature | ° C. | 75 | |
| MFR$_2$ | g/10 min | 4.0 | |
| XCS | wt.-% | 1.4 | |
| H$_2$/C$_3$ ratio | mol/kmol | 1.0 | |
| amount | wt.-% | 50 | |

TABLE 1-continued

| Polymerization and polymer properties | | | |
|---|---|---|---|
| | | PP-1 | PP-2 |
| GPR (Reactor 2) | | | |
| Time | h | 1.5 | |
| Temperature | ° C. | 80 | |
| Pressure | kPa | 2600 | |
| MFR$_2$ | g/10 min | 3.8 | |
| H$_2$/C$_3$ ratio | mol/kmol | 10.1 | |
| amount | wt.-% | 50 | |
| Powder properties | | | |
| porosity | % | 10.2 | 7.7 |
| specific pore volume | cm$^3$/g | 0.14 | 0.10 |
| median particle size d50 | μm | 350 | 420 |
| top-cut particle size d95 | μm | 600 | 1130 |
| Polymer properties | | | |
| Comonomer content | wt % | 0 | 0 |
| Isotacticity <mmmm> | % | 96.5 | 93.0 |
| 2,1 Regio-defects | mol-% | 0.0 | 0.0 |
| XCS | wt % | 1.8 | 3.0 |
| MFR$_2$ | g/10 min | 3.0 | 2.0 |
| T$_m$(DSC) | ° C. | 165 | 160 |

3. Reactive Modification

For the preparation of the propylene polymer compositions of inventive examples IE1 and IE2 and Comparative example CE3 the propylene polymers PP-1 and PP-2 were subjected to reactive modification using Perkadox 24L (Dicetyl peroxydicarbonate, commercially available from AkzoNobel Polymer Chemistry) as peroxide. No bifunctional agent was premixed to the propylene polymers as disclosed e.g. in EP 3 018 153 A1 and EP 3 018 154 A1. Instead the propylene polymer and the peroxide were mixed together in a melt mixing step with an additive package of antioxidant Irganox B 215 (commercially available from BASF SE), and Calcium stearate and acid scavenger ADK STAB HT (commercially available from Adeka Palmarole) in a co-rotating twin screw extruder of the type Coperion ZSK18 having a barrel diameter of 18 mm and an L/D-ratio of 40 equipped with a high intensity mixing screw having two kneading zones and a vacuum degassing setup. A melt temperature profile with initial temperature T1=180° C. in the feed zone, mid temperature T2=200° C. in the last kneading zone and a final temperature T3=230° C. in the die zone, all temperatures being defined as barrel temperature, was selected. The screw speed was set at 400 rpm.

For the preparation of the propylene polymer compositions of comparative examples CE1 and CE2 the propylene polymers PP-1 and PP-2 were melt mixed as described above without reactive modification.

Following the melt-mixing step, the resulting polymer melt was pelletized after solidification of the strands in a water bath in a strand pelletizer at a water temperature of 40° C. Reaction conditions and properties of the resulting propylene polymer compositions are summarized in Table 2.

TABLE 2

Melt mixing conditions and properties of the propylene polymer compositions

| Base polymer powder | | CE1<br>PP-1 | IE1<br>PP-1 | IE2<br>PP-1 | CE2<br>PP-2 | CE3<br>PP-2 |
|---|---|---|---|---|---|---|
| Polymer powder | wt % | 99.7 | 98.7 | 98.2 | 99.7 | 98.9 |
| Antioxidant | wt % | 0.2 | 0.2 | 0.2 | 0.2 | 0.2 |
| Ca-Stearat | wt % | 0.05 | 0.05 | 0.05 | 0.05 | 0.05 |
| Acid scavenger | wt % | 0.05 | 0.05 | 0.05 | 0.05 | 0.05 |
| POX Level | wt % | 0 | 1.0 | 1.5 | 0 | 0.8 |
| Process data | | | | | | |
| Screw speed | rpm | 400 | 400 | 400 | 400 | 400 |
| Throughput | kg/h | 7 | 7 | 7 | 7 | 7 |
| Barrel temperature | ° C. | 200 | 200 | 200 | 200 | 200 |
| Composition properties | | | | | | |
| $MFR_2$ | g/10 min | 3.64 | 1.21 | 1.29 | 1.58 | 1.58 |
| F30 | CN | 4.4 | 17.8 | 18.9 | n.m. | 22.2 |
| v30 | mm/s | 169.6 | 225.8 | 232.6 | n.m. | 220.0 |
| XHU | wt % | 0.33 | 0.10 | 0.02 | n.m. | 0 |
| Tm | ° C. | 166 | 167 | 167 | 162 | 163 |
| Tc | ° C. | 118 | 131 | 132 | 116 | 128 |
| Hm | J/g | 109 | 112 | 113 | 106 | 103 |
| XCS | wt % | 1.83 | 2.08 | 2.23 | 3.0 | n.m. |
| Flexural modulus | MPa | 1540 | 2019 | 1995 | 1542 | 1845 |
| HDT B | ° C. | 84.3 | 114 | 117 | 87.3 | 105.5 | n.m. not measured

It can be seen that by means of the simplified reactive modification process propylene polymer compositions comprising a long chain branched propylene homopolymer can be obtained which shows an improved balance of properties in regard of high stiffness, high melting and crystallization temperatures, low amount of XCS fraction, and high HDT, which is especially beneficial for moulding applications.

The present invention includes the following aspects:

A propylene polymer composition comprising a long chain branched propylene polymer, wherein said propylene polymer composition has a melt flow rate MFR2 (230° C., 2.16 kg) of 0.8 to 6.0 g/10 min, a xylene hot insolubles (XHU) fraction in an amount of not more than 0.80 wt %, based on the total weight amount of the propylene polymer composition, a melting temperature Tm of at least 160.0° C., a F30 melt strength of from 5.0 to less than 30.0 cN, and a heat distortion temperature (HDT) of at least 108° C.

In an aspect, the propylene polymer composition has a crystallization temperature Tc of more than 120.0° C., more preferably 122.0 to 145.0° C., still more preferably 126.0 to 140.0° C. and most preferably 129.0 to 138.0° C.

In an aspect, the propylene polymer composition has a V30 melting extensibility of at least 190 mm/s, more preferably 200 to 500 mm/s, still more preferably 210 to 400 mm/s and most preferably 210 to 300 mm/s.

In an aspect the propylene polymer composition has a flexural modulus of more than 1900 MPa, more preferably at least 1925 MPa, still more preferably at least 1950 MPa and most preferably from 1975 MPa to up to 2500 MPa.

Also disclosed is a process for producing a propylene polymer composition comprising the following steps:
  polymerizing propylene in the presence of a polymerization catalyst to produce a propylene polymer;
  recovering the propylene polymer;
  extruding the propylene polymer in the presence of a peroxide for introducing long chain branching into the propylene polymer; and
  recovering the propylene polymer composition.

In an aspect of the process, the polymerization catalyst is a Ziegler-Natta catalyst, which preferably is free of phthalate.

In an aspect of the process, the recovered propylene polymer has a median particle size d50 of from 100 to 1200 µm, preferably 150 to 1000 µm, still more preferably 200 to 800 µm and most preferably 250 to 500 µm and/or a top cut particle size d95 of from 300 to 2500 µm, preferably 350 to 2200 µm, still more preferably 400 to 2000 µm and most preferably 450 to 1000 µm.

In an aspect of the process, the recovered propylene polymer is a propylene homopolymer, which preferably has a pentad isotacticity of more than 94%, more preferably from 95 to 99%.

In an aspect of the process, the recovered propylene polymer has a xylene cold solubles (XCS) fraction in an amount of less than 3.0 wt %, more preferably from 0.5 to 2.8 wt %, still more preferably from 0.8 to 2.6 wt % and mot preferably from 1.0 to 2.4 wt %, based on the total weight amount of the recovered propylene polymer.

In an aspect of the process, the melt mixing the propylene polymer and the peroxide are melt mixed in a melt mixing device at a barrel temperature in the range of 160 to 280° C., more preferably 170 to 270° C. and most preferably 180 to 235° C.

In an aspect of the process, the peroxide has a half-time (t1/2) of not more than 6 min at a barrel temperature of 160 to 280° C. and/or the peroxide is added to the propylene polymer in an amount of 0.1 to 5.0 parts per weight (ppw) of peroxide per 100 parts per weight of propylene polymer.

In an aspect of the process, the long chain branching is introduced into the propylene polymer in the absence of a functionally unsaturated compound.

In an aspect of the process, the recovered propylene polymer composition of process step d) has a lower melt flow rate MFR2 (230° C., 2.16 kg) compared to the recovered propylene polymer of process step b).

Also disclosed is an article comprising the propylene polymer composition according to any one of the above aspects.

Further disclosed is the use of the propylene polymer composition as described above for the production of an article.

The invention claimed is:

1. A process for producing a propylene polymer composition comprising the following steps:
   (a) polymerizing propylene in the presence of a polymerization catalyst to produce a propylene polymer;
   (b) recovering the propylene polymer, wherein the recovered propylene polymer has a xylene cold solubles (XCS) fraction in an amount of less than 3.0 wt. % based on the total weight amount of the recovered propylene polymer;
   (c) extruding the propylene polymer in the presence of a peroxide for introducing long chain branching into the propylene polymer to form a propylene polymer composition; and
   (d) recovering the propylene polymer composition, wherein the recovered propylene polymer composition of step (d) has a lower melt flow rate $MFR_2$ (230° C., 2.16 kg) compared to the recovered propylene polymer of step (b).

2. The process according to claim 1, wherein the polymerization catalyst is a Ziegler-Natta catalyst.

3. The process according to claim 2, wherein the Ziegler-Natta catalyst is free of phthalate.

4. The process according to claim 1, wherein the recovered propylene polymer has a median particle size d50 of from 100 to 1200 μm.

5. The process according to claim 1, wherein the recovered propylene polymer has a top cut particle size d95 of from 300 to 2500 μm.

6. The process according to claim 1, wherein the recovered propylene polymer has a median particle size d50 of from 100 to 1200 μm and a top cut particle size d95 of from 300 to 2500 μm.

7. The process according to claim 6, wherein the median particle size d50 is of from 150 to 1000 μm and the top cut particle size d95 is of from 350 to 2200 μm.

8. The process according to claim 7, wherein the median particle size d50 is of from 200 to 800 μm and the top cut particle size d95 is of from 400 to 2000 μm.

9. The process according to claim 8, wherein the median particle size d50 is of from 250 to 500 um and the top cut particle size d95 is of from 450 to 1000 μm.

10. The process according to claim 1, wherein the recovered propylene polymer is a propylene homopolymer.

11. The process according to claim 10, wherein the propylene homopolymer has a pentad isotacticity of more than 94%.

12. The process according to claim 1, wherein the amount of the xylene cold solubles (XCS) is of from 0.8 to 2.6 wt % based on the total weight amount of the recovered propylene polymer.

13. The process according to claim 1, wherein the melt mixing the propylene polymer and the peroxide are melt mixed in a melt mixing device at a barrel temperature in a range of 160 to 280° C.

14. The process according to claim 1, wherein the peroxide has a half-time ($t_{1/2}$) of not more than 6 min at a barrel temperature of 160 to 280° C.

15. The process according to claim 1, wherein the peroxide is added to the propylene polymer in an amount of 0.1 to 5.0 parts per weight (ppw) of peroxide per 100 parts per weight of propylene polymer.

16. The process according to claim 1, wherein the peroxide has a half-time ($t_{1/2}$) of not more than 6 min at a barrel temperature of 160 to 280° C., and wherein the peroxide is added to the propylene polymer in an amount of 0.1 to 5.0 parts per weight (ppw) of peroxide per 100 parts per weight of propylene polymer.

17. The process according to claim 1, wherein the long chain branching is introduced into the propylene polymer in the absence of a functionally unsaturated compound.

18. An article comprising the propylene polymer composition produced by the process according to claim 1.

19. The process according to claim 1, wherein the recovered propylene polymer of process step b) has a melt flow rate $MFR_2$ (230°° C., 2.16 kg) of from 1.0 to 10.0 g/10 min.

20. The process according to claim 19, wherein the melt flow rate $MFR_2$ (230° C., 2.16 kg) is from 2.5 to 6.0 g/10 min.

* * * * *